United States Patent [19]

Ueki

[11] Patent Number: 5,158,372
[45] Date of Patent: Oct. 27, 1992

[54] SELF-ADJUSTABLE DOUBLE LINEAR MOTION GUIDE UNIT ASSEMBLY

[75] Inventor: Hiroshi Ueki, Ebina, Japan

[73] Assignee: Nippon Thompson Co., Ltd., Tokyo, Japan

[21] Appl. No.: 781,533

[22] Filed: Oct. 22, 1991

[30] Foreign Application Priority Data

Oct. 22, 1990 [JP] Japan .............................. 2-110448[U]

[51] Int. Cl.[5] .............................................. F16C 31/06
[52] U.S. Cl. ..................................................... 384/45
[58] Field of Search ........................... 384/45, 44, 43; 464/168

[56] References Cited

U.S. PATENT DOCUMENTS

| | | | |
|---|---|---|---|
| 4,902,143 | 2/1990 | Morita | 384/43 |
| 5,013,164 | 5/1991 | Tsukada | 384/45 |
| 5,059,037 | 10/1991 | Albert | 384/45 |
| 5,076,714 | 12/1991 | Teramachi | 384/45 |

Primary Examiner—Lenard A. Footland
Attorney, Agent, or Firm—Skjerven, Morrill, MacPherson, Franklin & Friel

[57] ABSTRACT

A double linear motion guide unit assembly includes a pair of first and second rails extending in parallel, a pair of first and second sliders which are slidably mounted on the first and second rails, respectively, a plurality of first rolling members interposed between the first rail and the first slider, a plurality of second rolling members interposed between the second rail and the second slider, and a sliding table commonly mounted on the first and second sliders as fixedly attached thereto. A Gothic arch shaped inner guide groove is formed in the first rail at each of its sides surfaces and a similarly shaped outer guide groove is formed in the first slider and a circular arc shaped inner guide groove is formed in the second rail at each of its shoulders and a similarly shaped outer guide groove is formed in the second slider.

7 Claims, 4 Drawing Sheets

SELF-ADJUSTABLE DOUBLE LINEAR MOTION GUIDE UNIT ASSEMBLY

BACKGROUND OF THE INVENTION

1. Field of the Invention

This invention generally relates to a linear motion guide unit, and, in particular, to a double linear motion guide unit assembly suitable for use in semiconductor manufacturing apparatuses, electronic business machines and various other devices, such as reading devices.

2. Description of the Prior Art

FIG. 4 illustrates in perspective view a typical prior art linear motion guide unit, which generally includes a rail A which is formed with a pair of inner guide grooves on its opposite side surfaces, a slider B mounted on the rail A in a straddling manner and having a pair of outer guide grooves E each located opposite to a corresponding one of the inner guide grooves C, and a plurality of rolling members F, or balls in the illustrated example, interposed between the rail A and the slider B as partly received in the paired inner and outer guide grooves C and E. In the structure shown in FIG. 4, the slider B is provided with a pair of endless circulating paths, each including a load path section, a return path section and a pair of curved connecting path sections connecting the corresponding ends of the load and return path sections, and the load path section is defined by the corresponding outer guide groove E.

With the above-described structure, since the balls E may roll along the associated endless circulating path indefinitely, the slider B may move along the rail A as long as the rail A extends. Those balls E which are located in the load path section are partly received in both of the inner and outer guide grooves C and E so that a rolling contact is provided between the rail A and the slider B. In order to provide a high precision, the linear motion guide unit shown in FIG. 4 is typically so structured that there is no room for the slider B to move in a transverse direction indicated by the double arrow M normal to the longitudinal axis of the rail A.

Using the linear motion guide unit shown in FIG. 4, a double linear motion guide unit assembly is constructed as illustrated in FIG. 5. The illustrated double linear motion guide unit assembly includes a pair of rails G and H which are fixedly mounted on a base I as spaced apart from each other and extending in parallel. Each of the rails G and H corresponds to the rail A in the structure shown in FIG. 4. The present assembly also includes a first pair of front and rear sliders J and K which are slidably mounted on the rail G and each of these sliders J and K corresponds to the slider B in FIG. 4. In addition, the present assembly also includes another pair of front and rear sliders L which are slidably mounted on the rail H and each of them also corresponds to the slider B in FIG. 4. The present assembly also includes a sliding table which is commonly mounted on these four sliders J, K and L as fixedly attached thereto. The sliding table is thus defines as a moving table for supporting thereon any desired portions of movable parts in semiconductor manufacturing devices and electronic business machines in which the present assembly is incorporated.

As described before, since there is no room for relative motion between the rail A and the slider B in the transverse direction as indicated by the double arrow M in FIG. 4, there is no room for relative motion between the sliding table and the rails G and H in the transverse direction as indicated by the double arrow M in FIG. 5. Although such a tight lateral constraint is not a problem when the linear motion guide unit shown in FIG. 4 is used alone, a significant problem could arise when two or more of the linear motion guide unit of FIG. 4 were used side-by-side as in the double linear motion guide unit assembly shown in FIG. 5. That is, since no tolerance is allowed in the transverse direction, the two rails G and H must be laid down in parallel at an extremely high accuracy, typically on the order of several tens of microns at maximum. As a result, difficulty will be encountered in building the assembly shown in FIG. 5 and the cost tends to be pushed up. In addition, the error in the parallel arrangement between these two rails also could increase due to an increase in temperature, and, thus, its scope of applications is rather limited, or special means must be provided for compensating for the temperature effects.

SUMMARY OF THE INVENTION

In accordance with the present invention, there is provided a linear motion guide unit assembly including a pair of first and second rails extending in parallel, at least one first slider slidably mounted on the first rail, a plurality of first rolling members interposed between the first rail and the first slider, at least one second slider slidably mounted on the second rail, a plurality of second rolling members interposed between the second rail and the second slider, and a sliding table fixedly mounted on both of said first and second sliders. The first rail has a top surface, a bottom surface and a pair of opposite side surfaces, each of which is formed with an inner guide groove between the top and bottom surfaces, extending in parallel with the longitudinal axis of the first rail. The first slider is formed with a pair of outer guide grooves, each located opposite to a corresponding one of the inner guide grooves of the first rail to thereby define a guide channel along which the first rolling members may roll.

The second rail has a top surface, a bottom surface and a pair of opposite surfaces, and the second rail is also formed with a pair of inner guide grooves located at a shoulder at a junction between the top surface and each of the side surfaces, extending in parallel with the longitudinal axis of the second rail. The second slider is formed with a pair of outer guide grooves, each located opposite to a corresponding one of the inner guide grooves of the second rail to thereby define a guide channel along which the second rolling members may roll.

Preferably, each of the inner and outer guide grooves of the first rail and slider, respectively, has a Gothic arch-shaped cross sectional shape. On the other hand, each of the inner and outer guide grooves of the second rail and slider, respectively, has a circular arc-shaped cross sectional shape. In addition, each of the first and second sliders is preferably provided with a pair of endless circulating paths, each including a load path section, a return path section and a pair of curved connecting path sections connecting the corresponding ends of the load and return path sections, whereby the load path section defines the outer guide groove. Preferably, the first and second rolling members are balls.

It is therefore a primary object of the present invention to provide an improved double linear motion guide unit assembly which is self-adjustable for errors in the parallel arrangement between two rails.

Another object of the present invention is to provide an improved double linear motion guide unit assembly high and smooth in performance, simple in structure and thus easy to manufacture at low cost.

A still further object of the present invention is to provide an improved linear motion guide unit assembly which allows a certain tolerance in the parallel arrangement of two rails, which facilitates its manufacture significantly.

A still further object of the present invention is to provide an improved double linear motion guide unit assembly which is least affected by temperature changes.

Other objects, advantages and novel features of the present invention will become apparent from the following detailed description of the invention when considered in conjunction with the accompanying drawings.

DESCRIPTION OF THE PREFERRED EMBODIMENTS

Figure 1:
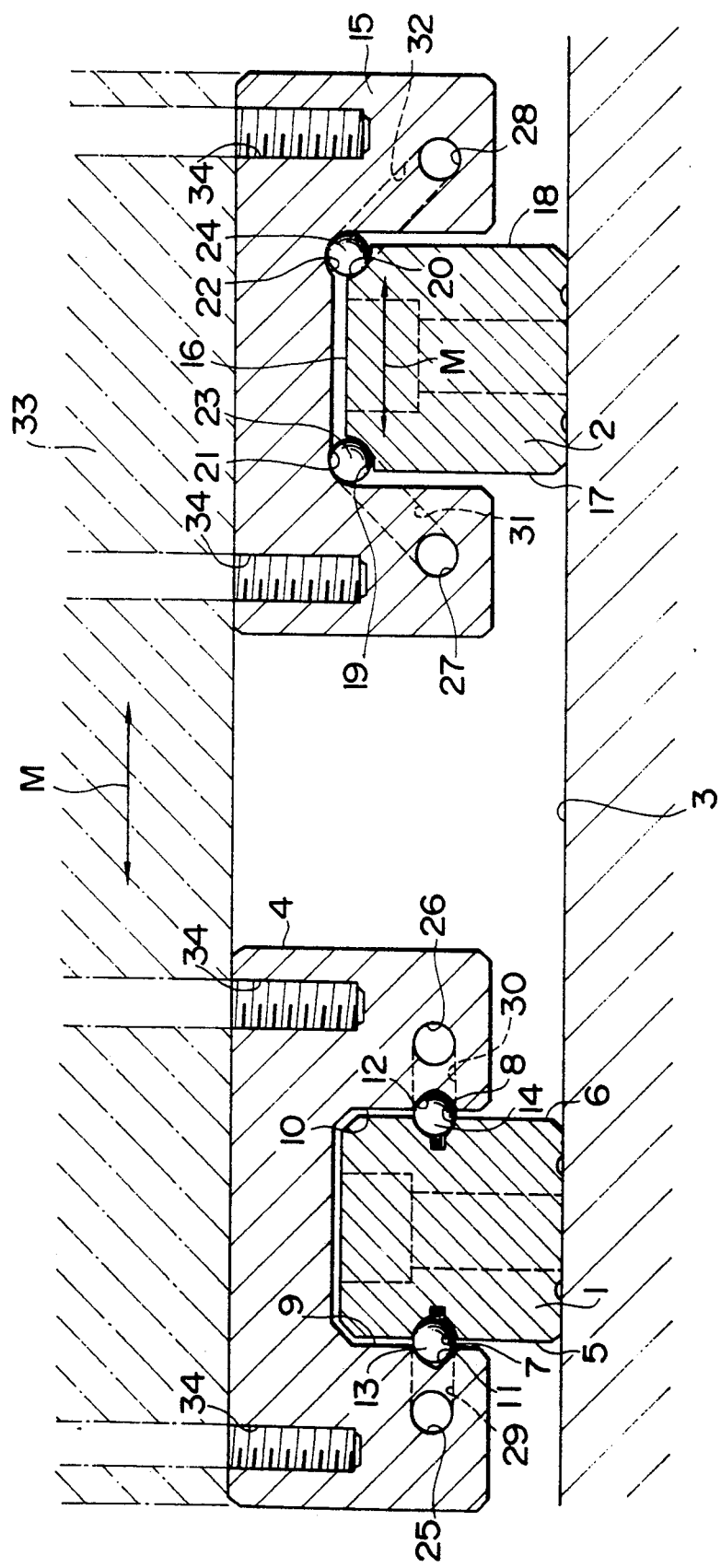
FIG. 1 is a schematic illustration showing in transverse cross section a double linear motion guide unit assembly constructed in accordance with one embodiment of the present invention.

Referring now to FIG. 1, there is schematically shown a double linear motion guide unit assembly constructed in accordance with one embodiment of the present invention. The present assembly includes a pair of first and second rails 1 and 2 which are elongated and are fixedly mounted on a base 3 in parallel and spaced apart from each other. The first rail 1 has a top surface, a bottom surface which is in contact with the base 3 and a pair of opposite side surfaces 5 and 6. In the illustrated structure, each of the side surfaces 5 and 6 is substantially vertical and flat and is formed an inner guide groove 7 and 8, respectively, which extends in parallel with the longitudinal axis of the rail 1. As will be described more in detail later, each of the inner guide grooves 7 and 8 has a substantially Gothic arch-shaped cross sectional shape. Of importance, each of the inner guide grooves 7 and 8 is located midway between the top and bottom surfaces, and, in the illustrated structure, both of the inner guide surfaces 7 and 8 are located at the same level.

The second rail 2 is spaced apart from the first rail 1 over a predetermined distance such that the first and second rails 1 and 2 extend substantially in parallel. The second rail 2 also has a top surface, a bottom surface which is in contact with the base 3 and a pair of opposite side surfaces 7 and 18, each of which is substantially vertical and flat in the illustrated structure. Importantly, the second rail 2 is formed with a pair of inner guide grooves 19 and 20 each of which is located at a shoulder or junction between the top surface and each of the side surfaces. As will be described more in detail later, each of the inner guide grooves 19 and 20 at the shoulders of the second rail 2 has a substantially circular arc-shaped cross sectional shape.

The present assembly also includes a first slider 4 which is slidably mounted on the first rail 1 and which has a generally inverted U-shaped cross section and thus includes a horizontal section and a pair of vertical sections extending downward from the opposite sides of the horizontal section. Each of the horizontal sections of the second slider 4 is formed at its inner surface with an outer guide groove 11 or 12 located opposite to and in parallel with a corresponding one of the pair of inner guide grooves 7 and 8 of the first rail 1. Preferably, each of the outer guide grooves 11 and 12 of the first slider 4 also has a substantially Gothic arch-shaped cross sectional shape. Thus, a guide channel is defined by paired inner and outer guide grooves 7 and 11 and another guide channel is defined by paired inner and outer guide grooves 8 and 12. And a plurality of balls 13 and 14 are provided in these guide channels, respectively, such that the balls 13 and 14 are partly received in both of the paired inner and outer guide grooves 7 and 11 or 8 and 12, respectively. Thus, a rolling contact is provided between the first rail 1 and the first slider 4 so that the first slider 4 may move along the first rail 1 slidingly.

Figure 2:
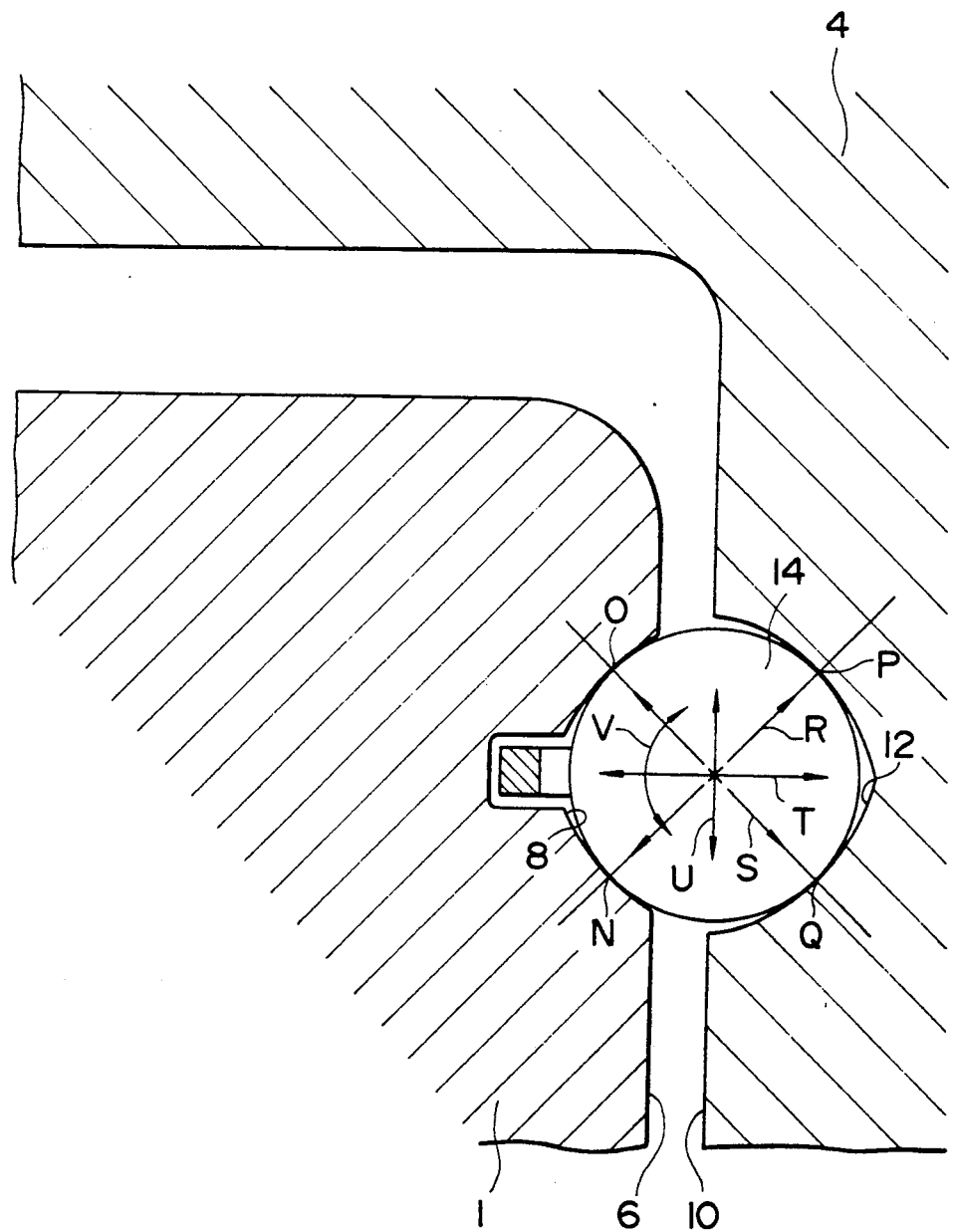
FIG. 2 is a schematic illustration showing on a somewhat enlarged view the rolling contact condition between the guide grooves having Gothic arch-shaped cross sectional shapes and the ball in assembly of FIG. 1.

FIG. 2 illustrates on a somewhat enlarged scale the rolling contact condition between the guide channel defined by the paired inner and outer guide grooves 8 and 12 and the ball 14. As shown there, since each of the inner and outer guide grooves 8 and 12 has a substantially Gothic arch-shaped cross sectional shape, the ball 14 makes a point contact at four points N, O, P and Q with the inner and outer guide grooves 8 and 12. In the illustrated structure, a hypothetical straight line drawn through two contact points O and Q substantially pass through the center of the ball 14 and another hypothetical straight line drawn through two contact points N and P also substantially pass through the center of the ball 14. Preferably, the ball 14 is under pressure determined by a preloading condition at these four contact points. As a result, the rolling contact structure shown in FIG. 2 can bear loads in any direction as indicated by double arrows R, S, T and U and also moment around the center of the ball 14 as indicated by the double arrow V. Such a rolling contact structure allows to provide a linear motion at high accuracy. In other words, there is no lateral motion allowed between the first rail 1 and the first slider 4 because of this tight rolling contact structure. It should be noted that the similar rolling contact condition exists for the remaining rolling contact structure defined by the paired inner and outer guide grooves 7 and 11 and the ball 13.

Figure 4:
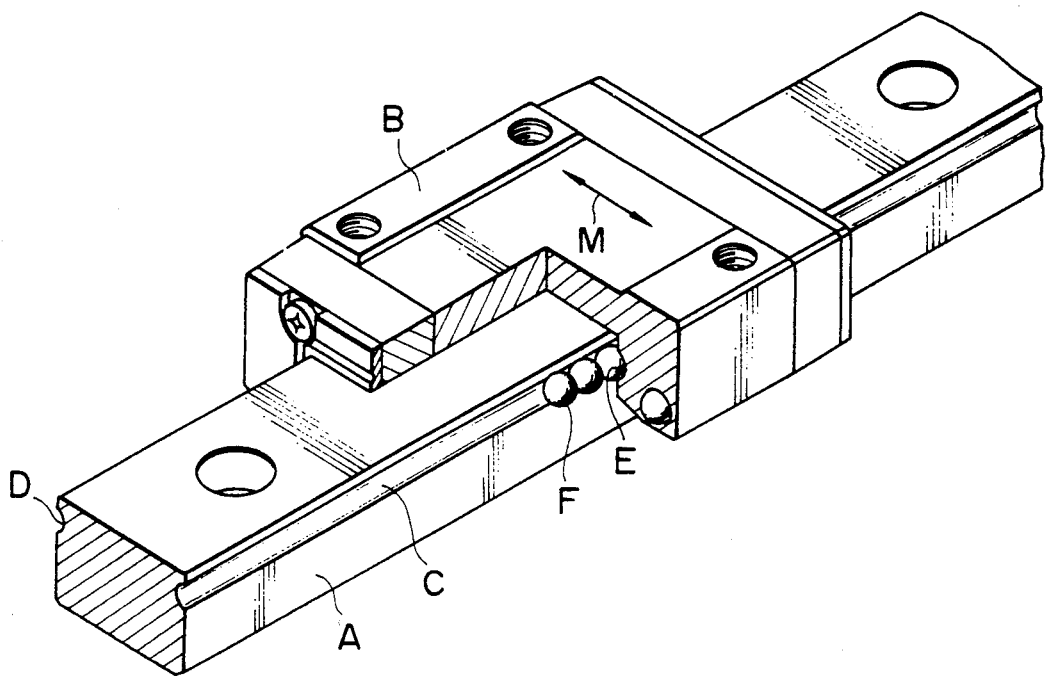
FIG. 4 is a schematic illustration showing in perspective view with parts broken away a typical prior art linear motion rolling contact guide unit.
Figure 5:
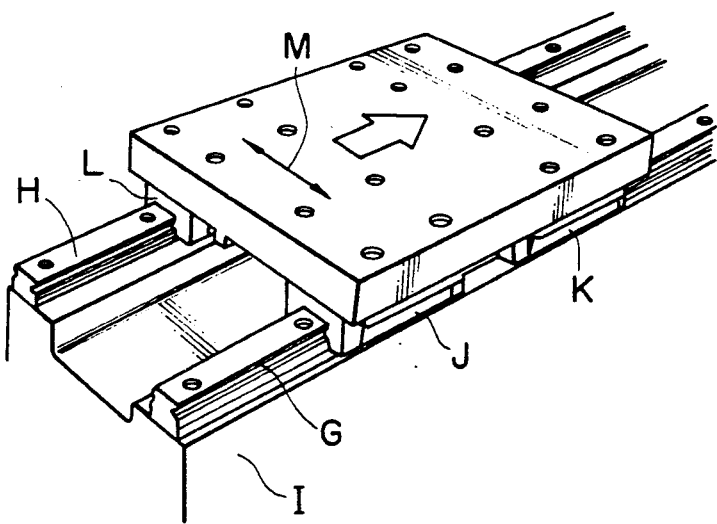
FIG. 5 is a schematic illustration showing in perspective view a typical prior art double linear motion guide unit assembly constructed using the basic structure of the guide unit shown in FIG. 4.

In a preferred embodiment, the first slider 4 is provided with a pair of endless circulating paths, each including a load path section which corresponds to the outer guide groove 11 or 12, a return path section 25 or 26 and a pair of curved connecting path sections 29 or 30 connecting the corresponding ends of the load and return path sections. A plurality of balls 13 are provided in the left-hand endless circulating path and also a plurality of balls 14 are provided in the right-hand endless circulating path. With this structure, the first slider 4 may slide along the first rail 1 as long as the first rail 1 extends without limits. Preferably, the first slider 4 has a three-part structure, i.e., a center block and a pair of front and rear end blocks, as well known in the art and illustrated in FIG. 4. In this case, both of the load and return path sections are preferably formed in the center block and the curved connecting path section is formed in each of the front and rear end blocks for the ease of manufacture.

The present assembly also includes a second slider 15 which is slidably mounted on the second rail 2 in a straddling manner. The second slider 15 also has a generally inverted U-shaped cross section and thus it includes a horizontal section and a pair of vertical sections which depend from the opposite sides of the horizontal section. The second slider 15 is also formed with a pair of outer guide grooves 21 and 22 which are located opposite to the inner guide grooves 19 and 20, respectively, at the shoulders of the second rail 2 to thereby define a pair of guide channels in which a plurality of balls 23 and 24 are provided, respectively. In the illustrated structure, each of the outer guide grooves 21 and 22 is formed at an inside corner of a junction between the horizontal section and each of the vertical sections.

Figure 3:
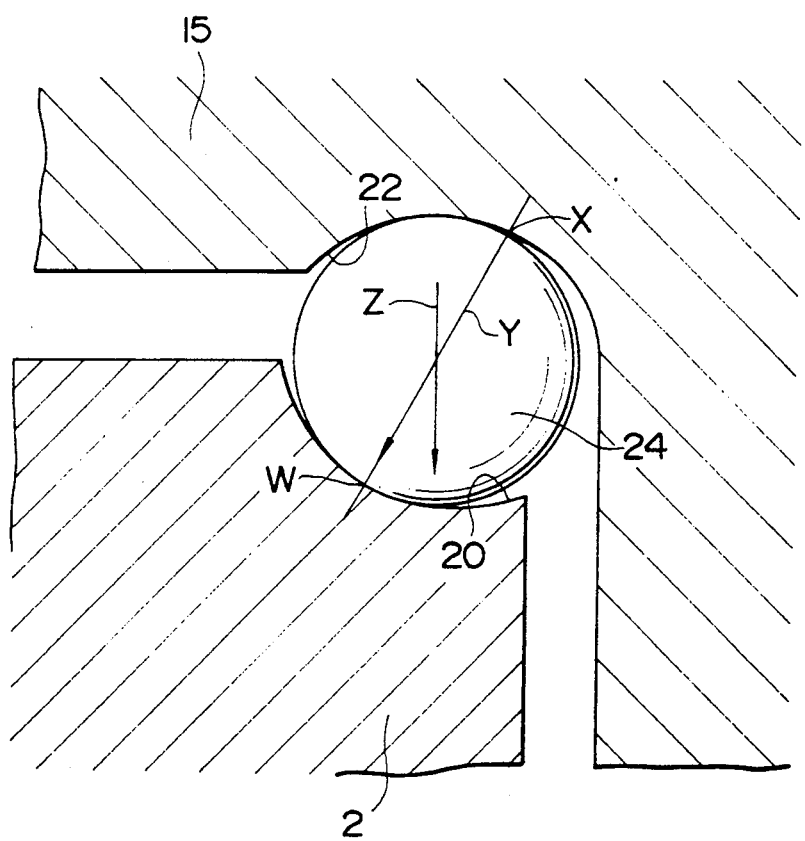
FIG. 3 is a schematic illustration showing on a somewhat enlarged view the rolling contact condition between the guide grooves having circular arc-shaped cross sectional shapes and the ball in the assembly of FIG. 1.

Preferably, each of the outer guide grooves 21 and 22 also has a substantially circular arc cross sectional shape. FIG. 3 illustrates the rolling contact condition at a guide channel defined by the paired inner and outer guide grooves 20 and 22. The ball 24 makes a contact with each of the inner and outer guide grooves 20 and 22 only at one point, i.e., X and W, as indicated in FIG. 3, and the ball 24 mainly support loads directed downward as exemplified by arrows Y and Z. With this rolling contact structure, a lateral motion between the second rail 2 and the second slider 15 in the direction transverse to the longitudinal axis of the second rail 2 is allowed over a predetermined range. Since the rolling contact structure defined by the paired inner and outer guide grooves 19 and 21 and the ball 23 is basically identical to that shown in FIG. 3 and described above, a lateral relative motion between the second rail 2 and the second slider 15 over a predetermined range is allowed, and this lateral motion allows to absorb any errors in the parallel arrangement between the two rails 1 and 2.

In a preferred embodiment, the second slider 15 is also provided with a pair of endless circulating paths, each including a load path section which corresponds to the outer guide groove 21 or 22, a return path section 27 or 28 and a pair of curved connecting path sections 31 or 32 connecting the corresponding ends of the load and return path sections. In this case, a plurality of balls 23 are provided in the left-hand endless circulating path and a plurality of balls 24 are also provided in the right-hand endless circulating path, so that the second slider 15 may move along the second rail 2 as long as the second rail 2 extends. The second slider 15 may also has a three-part structure as described with respect to the first slider 4.

The present assembly also includes a sliding table 33 which is commonly mounted on the first and second sliders 4 and 15 as fixedly attached thereto, for example, using bolts threaded into threaded holes 34 provided in each of the first and second sliders 4 and 15.

In the above-described structure, although no lateral movement is allowed between the first rail 1 and the first slider 4, since a limited lateral movement is allowed between the second slider 15 and the second rail 2 as indicated by the double arrow M, the sliding table 33 as a whole can absorb errors in alignment between the first and second rails 1 and 2 to some extent. Thus, such errors in alignment up to several tens of microns may be allowed between the first and second rails 1 and 2 according to the present invention.

Therefore, the present assembly would experience no fluctuations in sliding resistance due to errors in alignment between the first and second rails 1 and 2 and allows to provide a smooth operation at all times. In addition, since errors in alignment over a predetermined range are allowed, the laying down operation of the rails 1 and 2 can be greatly facilitated. Furthermore, the present assembly can be used in temperature fluctuating conditions in which errors in parallel arrangement between the two rails 1 and 2 may occur and fluctuate.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear motion guide unit assembly, comprising
a first rail elongated in shape and having a pair of opposite side surfaces, each of which is formed with an inner guide groove having a first predetermined cross sectional shape;
a first slider slidably mounted on said first rail in a straddling manner, said first slider being formed with a pair of outer guide grooves each located opposite to a corresponding inner guide groove of said first rail and having said first predetermined cross sectional shape;
a plurality of first rolling members interposed between each of paired inner and outer guide grooves having said first cross sectional shape;
a second rail elongated in shape and formed with a pair of inner guide grooves having a second cross sectional shape different from said first cross sectional shape at a pair of shoulders, respectively,
a second slider slidably mounted on said second rail in a straddling manner, said second slider being formed with a pair of outer guide grooves each located opposite to a corresponding one of said pair of inner guide grooves of said second rail and having said second cross sectional shape;
a plurality of second rolling members interposed between each of paired inner and outer guide grooves having said second cross sectional shape; and
a sliding table commonly mounted on said first and second sliders as fixedly attached thereto.

2. The assembly of claim 1, wherein said first cross sectional shape is a substantially Gothic arch shaped cross sectional shape.

3. The assembly of claim 2, wherein said second cross sectional shape is a substantially circular arc cross sectional shape.

4. The assembly of claim 1, wherein each of said first and second sliders is provided with a pair of endless circulating paths, each including a load path section, a return path section and a pair of curved connecting path sections connecting corresponding ends of said load and return path sections, and wherein said load path section defines said outer guide groove.

5. The assembly of claim 4, wherein said first and second rolling members are balls.

6. The assembly of claim 5, wherein each of said first and second rails has a generally rectangular cross section and thus has a top surface, a bottom surface and a pair of side surfaces, and wherein each of said inner guide grooves formed at the shoulders of said second rail is located at a junction between said top surface and each of said side surfaces.

7. The assembly of claim 6, wherein each of said inner guide grooves formed in the side surfaces of said first rail is located substantially away from said top and bottom surfaces.

* * * * *